United States Patent
Higashihara et al.

(10) Patent No.: US 9,562,130 B2
(45) Date of Patent: Feb. 7, 2017

(54) AROMATIC HYDROCARBON FORMALDEHYDE RESIN, MODIFIED AROMATIC HYDROCARBON FORMALDEHYDE RESIN AND EPOXY RESIN, AND METHODS FOR PRODUCING THESE

(71) Applicant: MITSUBISHI GAS CHEMICAL COMPANY, INC., Tokyo (JP)

(72) Inventors: Go Higashihara, Okayama (JP); Atsushi Okoshi, Okayama (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/896,489

(22) PCT Filed: Jun. 16, 2014

(86) PCT No.: PCT/JP2014/065942
§ 371 (c)(1),
(2) Date: Dec. 7, 2015

(87) PCT Pub. No.: WO2014/203868
PCT Pub. Date: Dec. 24, 2014

(65) Prior Publication Data
US 2016/0130384 A1    May 12, 2016

(30) Foreign Application Priority Data

Jun. 18, 2013  (JP) .................................. 2013-127439

(51) Int. Cl.
| | | |
|---|---|---|
| *C08G 59/04* | (2006.01) | |
| *C08G 16/02* | (2006.01) | |
| *C08G 59/08* | (2006.01) | |
| *C08G 10/04* | (2006.01) | |
| *C08G 14/12* | (2006.01) | |
| *C08G 59/02* | (2006.01) | |

(52) U.S. Cl.
CPC ........... *C08G 16/0225* (2013.01); *C08G 10/04* (2013.01); *C08G 14/12* (2013.01); *C08G 59/02* (2013.01); *C08G 59/04* (2013.01); *C08G 59/08* (2013.01)

(58) Field of Classification Search
None
See application file for complete search history.

(56) References Cited

U.S. PATENT DOCUMENTS

| | | | | |
|---|---|---|---|---|
| 4,172,858 A | * | 10/1979 | Clubley | ................ C08L 101/02 524/130 |
| 4,207,224 A | * | 6/1980 | Randell | .................. C08G 10/02 524/123 |
| 4,689,392 A | | 8/1987 | Miyamoto et al. | |
| 5,612,442 A | * | 3/1997 | Okazaki | ................. C07C 39/15 528/212 |
| 2012/0181251 A1 | | 7/2012 | Minegishi et al. | |
| 2014/0246400 A1 | | 9/2014 | Higashihara et al. | |

FOREIGN PATENT DOCUMENTS

| | | |
|---|---|---|
| JP | 61-228013 | 10/1986 |
| JP | 07-173235 | 7/1995 |
| JP | 9-255603 | 9/1997 |
| JP | 2001-64340 | 3/2001 |
| JP | 2003-183342 | 7/2003 |
| JP | 2008-189708 | 8/2008 |
| JP | 2010-254990 | 11/2010 |
| JP | 2011-46837 | 3/2011 |
| JP | 2013-095640 | 5/2013 |
| WO | 2011/040340 | 4/2011 |
| WO | 2013/047106 | 4/2013 |

OTHER PUBLICATIONS

"Imoto, The Journal of the Society of Chemical Industry, Japan", The Chemical Society of Japan, Dec. 1966, pp. 2324-2327, vol. 69, No. 12.
Search Report issued by PCT/JP2014/065942 patent office in PCT/JP2014/065942 Patent Application No. , dated Sep. 16, 2014.
International Preliminary Report on Patentability, issued Sep. 16, 2014 in PCT/JP2014/065942.

* cited by examiner

*Primary Examiner* — Robert S Loewe
(74) *Attorney, Agent, or Firm* — Greenblum & Bernstein, P.L.C.

(57) ABSTRACT

There is provided an aromatic hydrocarbon formaldehyde resin obtained by reacting an aromatic hydrocarbon compound (A) represented by the following formula (1) with formaldehyde (B) in the presence of an acidic catalyst.

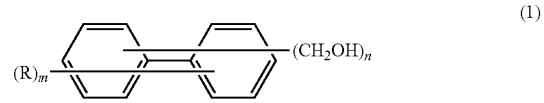

(1)

wherein R represents an organic group having 1 to 10 carbon atoms; m and n represent integers satisfying $1 \leq m+n \leq 10$, $m \geq 0$ and $n \geq 1$.

20 Claims, No Drawings

AROMATIC HYDROCARBON FORMALDEHYDE RESIN, MODIFIED AROMATIC HYDROCARBON FORMALDEHYDE RESIN AND EPOXY RESIN, AND METHODS FOR PRODUCING THESE

TECHNICAL FIELD

The present invention relates to an aromatic hydrocarbon formaldehyde resin, a modified aromatic hydrocarbon formaldehyde resin and an epoxy resin, and methods for producing these.

BACKGROUND ART

There is made a study in which a biphenyl compound and formaldehyde are subjected to a condensation reaction to thereby obtain an aromatic hydrocarbon resin (see Non Patent Document 1).

It is further known that in the usual reaction condition in which an aromatic hydrocarbon formaldehyde resin is produced by a reaction of an aromatic hydrocarbon with formaldehyde, diarylmethanes formed from two molecules of aromatic hydrocarbons and one molecule of formaldehyde are produced, and remain as unreacted components also after modification, so that the mechanical strength and the thermal decomposition resistance of cured products obtained from the modified resin decrease. Then, there is made an attempt of suppressing the formation of the diarylmethanes by controlling the reaction condition (see Patent Document 1).

CITATION LIST

Patent Document

Patent Document 1: Japanese Patent Application Laid-Open No. 61-228013

Non Patent Document

Non Patent Document 1: Imoto, *The Journal of the Society of Chemical Industry, Japan*, The Chemical Society of Japan, December, 1966, Vol. 69, No. 12, pp. 2324-2327

SUMMARY OF INVENTION

Technical Problem

The means described in Patent Document 1, however, is not much more than one in which the formation of diarylmethanes is suppressed by altering the reaction condition including suppression of the reaction rate of formaldehyde, and by which it is difficult to suppress the formation of the diarylmethanes more sufficiently than conventionally.

It is an object of the present invention to provide an aromatic hydrocarbon formaldehyde resin which allows decreasing, more sufficiently than conventionally, diarylmethanes always ending in being formed as long as conventionally used reactive substrates are used in production of the aromatic hydrocarbon formaldehyde resin, and which is excellent in the reactivity and the thermal decomposition resistance in modification, a modified aromatic hydrocarbon formaldehyde resin and an epoxy resin obtained therefrom, and methods for producing these.

Solution to Problem

As a result of exhaustive studies, the present inventors have found that a resin obtained by reacting a specific hydroxymethyl-substituted aromatic hydrocarbon compound with formaldehyde in the presence of an acidic catalyst can solve the above problem, and this finding has led to the present invention.

That is, the present invention is as follows.

[1]

An aromatic hydrocarbon formaldehyde resin, being obtained by reacting an aromatic hydrocarbon compound (A) represented by the following formula (1) with formaldehyde (B) in the presence of an acidic catalyst:

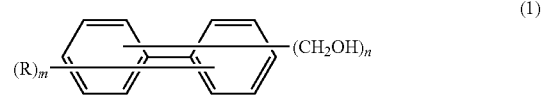

wherein R represents an organic group having 1 to 10 carbon atoms; m and n represent integers satisfying $1 \leq m+n \leq 10$, $m \geq 0$ and $n \geq 1$.

[2]

The aromatic hydrocarbon formaldehyde resin according to [1], being obtained by reacting the aromatic hydrocarbon compound (A) with formaldehyde (B) in a molar ratio of (A):(B)=1:1 to 1:20 in the presence of an acidic catalyst.

[3]

The aromatic hydrocarbon formaldehyde resin according to [1] or [2], wherein the reaction of the aromatic hydrocarbon compound (A) with formaldehyde (B) is carried out in the presence of an alcohol.

[4]

The aromatic hydrocarbon formaldehyde resin according to any one of [1] to [3], having a weight-average molecular weight of 200 to 25,000.

[5]

The aromatic hydrocarbon formaldehyde resin according to any one of [1] to [4], having an oxygen content of 7 to 18% by mass.

[6]

The aromatic hydrocarbon formaldehyde resin according to any one of [1] to [5], comprising substantially no diarylmethane.

[7]

A method for producing an aromatic hydrocarbon formaldehyde resin, comprising reacting an aromatic hydrocarbon compound (A) represented by the following formula (1) with formaldehyde (B) in the presence of an acidic catalyst:

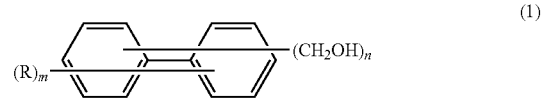

wherein R represents an organic group having 1 to 10 carbon atoms; m and n represent integers satisfying $1 \leq m+n \leq 10$, $m \geq 0$ and $n \geq 1$.

[8]

A modified aromatic hydrocarbon formaldehyde resin, being obtained by reacting an aromatic hydrocarbon formaldehyde resin according to any one of [1] to [6] with at least one selected from the group consisting of compounds represented by the following formulae (2) and (3) in the presence of an acidic catalyst:

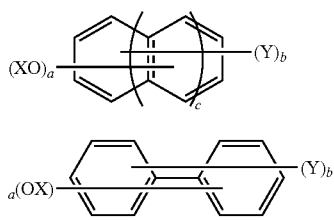

wherein X and Y each independently represent a hydrogen atom or an organic group having 1 to 10 carbon atoms; and a and b represent integers satisfying 1≤a+b≤10, a≥1 and b≥0, and c represents an integer of 0 to 2.

[9]

The modified aromatic hydrocarbon formaldehyde resin according to [8], wherein the compounds represented by the formulae (2) and (3) are at least one selected from the group consisting of phenol, cresol, catechol, hydroquinone, phenylphenol, biphenol, naphthol, dihydroxynaphthalene, hydroxyanthracene and dihydroxyanthracene.

[10]

A method for producing a modified aromatic hydrocarbon formaldehyde resin, comprising reacting an aromatic hydrocarbon formaldehyde resin according to any one of [1] to [6] with at least one selected from the group consisting of compounds represented by the following formulae (2) and (3) in the presence of an acidic catalyst:

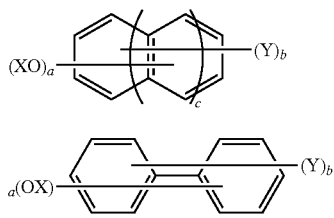

wherein X and Y each independently represent a hydrogen atom or an organic group having 1 to 10 carbon atoms; and a and b represent integers satisfying 1≤a+b≤10, a≥1 and b≥0, and c represents an integer of 0 to 2.

[11]

An epoxy resin, being obtained by reacting a modified aromatic hydrocarbon formaldehyde resin according to [8] with epichlorohydrin.

[12]

A method for producing an epoxy resin, comprising reacting a modified aromatic hydrocarbon formaldehyde resin according to [8] with epichlorohydrin to thereby obtain the epoxy resin.

Advantageous Effects of Invention

The present invention can provide an aromatic hydrocarbon formaldehyde resin which allows decreasing, more sufficiently than conventionally, diarylmethanes always ending in being formed as long as conventionally used reactive substrates are used in production of the aromatic hydrocarbon formaldehyde resin, and which is excellent in the reactivity and the thermal decomposition resistance in modification, a modified aromatic hydrocarbon formaldehyde resin and an epoxy resin obtained therefrom, and methods for producing these.

DESCRIPTION OF EMBODIMENT

Hereinafter, an embodiment according to the present invention will be described (hereinafter, referred to as "the present embodiment"). Here, the present embodiment is an exemplification to describe the present invention, and the present invention is not limited only to the present embodiment.

<Aromatic Hydrocarbon Formaldehyde Resin>

An aromatic hydrocarbon formaldehyde resin according to the present embodiment is obtained by condensation reacting an aromatic hydrocarbon compound (hereinafter, also referred to as "hydroxymethyl-substituted aromatic hydrocarbon compound") represented by the following formula (1) with formaldehyde in the presence of an acidic catalyst.

Here, a mechanism of producing a diarylmethane in a conventional production process of an aromatic hydrocarbon formaldehyde resin is shown below by taking a reaction of biphenyl as an example.

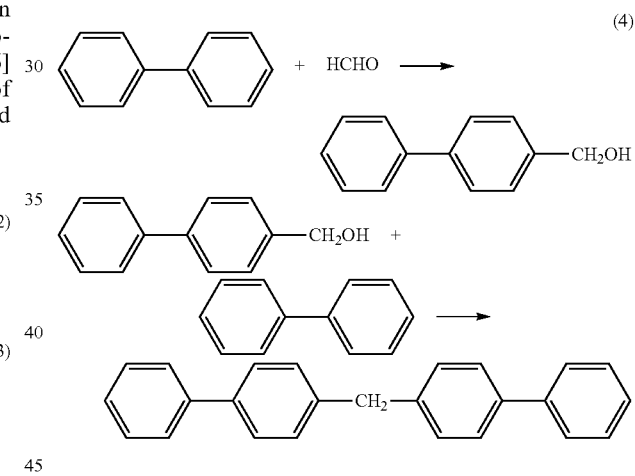

In the mechanism, first, formaldehyde is reacted with biphenyl to thereby produce biphenylmethanol; and the biphenylmethanol is subjected to a dehydrating condensation reaction with another molecule of biphenyl to thereby produce the diarylmethane represented by the above formula (4).

By contrast, in the present embodiment, since a hydroxymethyl-substituted aromatic hydrocarbon compound as a raw material has a structure in which one hydroxymethyl group is previously bonded, even when these compounds are subjected to a dehydrating condensation reaction, a compound represented by the following formula (5) which is crosslinked with a methyleneoxymethylene group is obtained, so diarylmethanes can be decreased more sufficiently than conventionally.

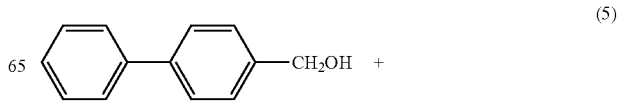

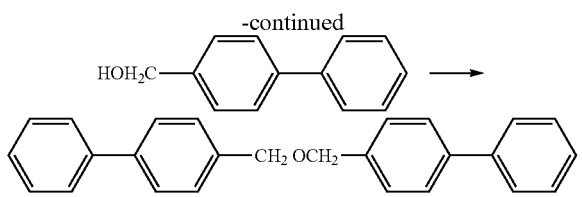

A major reaction product as an aromatic hydrocarbon formaldehyde resin obtained by using a reactive substrate according to the present embodiment has a structure containing hydroxymethyl groups previously bonded to the aromatic rings, and methylene groups and oxymethylene groups formed from added formaldehyde. The major reaction product is obtained as a mixture of a plurality of compounds in which bonding positions and numbers of these substituents on the aromatic rings are different. More specifically, for example, a biphenyl formaldehyde resin obtained by reacting biphenylmethanol in the presence of formalin and concentrated sulfuric acid may be a mixture whose representative composition has compounds represented by the following formulae (6), (7), (8) and (9).

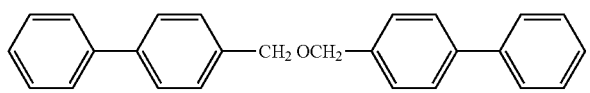

(6)

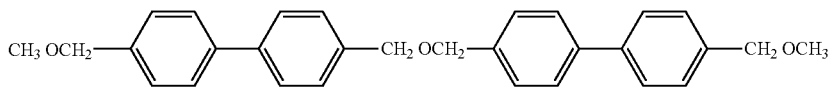

(7)

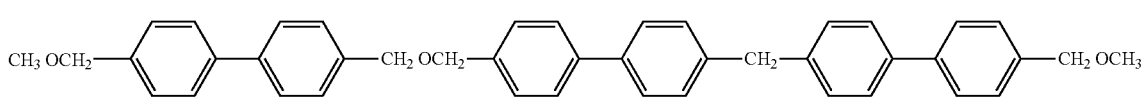

(8)

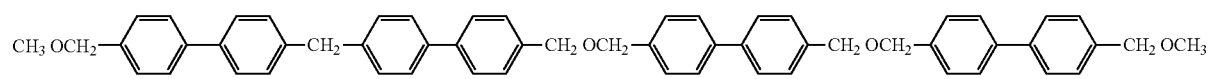

(9)

An aromatic hydrocarbon compound represented by the following formula (1) according to the present embodiment is a compound in which at least one hydrogen atom of aromatic rings of biphenyl is substituted with a hydroxymethyl group. Examples of such a compound include biphenylmethanol, biphenyldimethanol, methylbiphenylmethanol, methylbiphenyldimethanol, dimethylbiphenyimethanol and dimethylbiphenyldimethanol.

These hydroxymethyl-substituted aromatic hydrocarbon compounds are not particularly limited, and industrially available ones can be utilized.

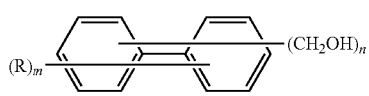

(1)

wherein R represents an organic group having 1 to 10 carbon atoms; m and n represent integers satisfying $1 \leq m+n \leq 10$, $m \geq 0$ and $n \geq 1$.

In the formula (1), from the viewpoint of the productivity, R is preferably an alkyl group having 1 to 10 carbon atoms or an allyl group having 3 to 10 carbon atoms, and more preferably an alkyl group having 1 to 4 carbon atoms or an allyl group having 3 to 6 carbon atoms; and it is preferable that m is 0 to 2, and n is 1 to 2. Examples of such an alkyl group and allyl group include a methyl group, an ethyl group, a propyl group, a butyl group, a pentyl group, a hexyl group, a heptyl group, an octyl group, a nonyl group, a decyl group, a propenyl group, a butenyl group, a pentenyl group, a hexenyl group, a heptenyl group, an octenyl group, a nonenyl group and a decenyl group. Further the compound represented by the above formula (1) is still more preferably biphenylmethanol, and particularly preferably 4-biphenylmethanol.

Formaldehyde in the present embodiment is not particularly limited, and may be used, for example, in a form of a formaldehyde aqueous solution, which is usually industrially available. Formaldehyde in the present embodiment includes formaldehyde generated in use of a compound such as paraformaldehyde or trioxane, which generates formaldehyde. Among these, from the viewpoint of the suppression of gelation, preferable is a formaldehyde aqueous solution.

In the condensation reaction in the present embodiment, the molar ratio of the compound represented by the above formula (1) to formaldehyde (a compound represented by the above formula (1): formaldehyde) is not particularly limited, but is preferably 1:1 to 1:20, more preferably 1:1.5 to 1:17.5, still more preferably 1:2 to 1:15, further still more preferably 1:2 to 1:12.5, further still more preferably 1:2.5 to 1:10, particularly preferably 1:3 to 1:10, and extremely preferably 1:3 to 1:5. The aromatic hydrocarbon formaldehyde resin according to the present embodiment can have more of a crosslinking structure by condensation reacting a compound represented by the above formula (1) with formaldehyde in the above-mentioned proportions. Further by condensation reacting a compound represented by the above formula (1) with formaldehyde in the above-mentioned proportions, the amount of the hydroxymethyl-substituted aromatic hydrocarbon compound remaining as an unreacted substance can be made smaller, and the yield of the obtained aromatic hydrocarbon formaldehyde resin can be maintained higher.

The acidic catalyst in the present embodiment is not particularly limited, and well-known inorganic acids and organic acids can be used. Examples of the acidic catalyst include inorganic acids such as hydrochloric acid, sulfuric acid, phosphoric acid, hydrobromic acid and hydrofluoric acid; organic acids such as oxalic acid, malonic acid, succinic acid, adipic acid, sebacic acid, citric acid, fumaric acid, maleic acid, formic acid, p-toluenesulfonic acid, methanesulfonic acid, trifluoroacetic acid, dichloroacetic acid, trichloroacetic acid, trifluoromethanesulfonic acid, benzenesulfonic acid, naphthalenesulfonic acid and naphthalenedisulfonic acid; Lewis acids such as zinc chloride, aluminum chloride, iron chloride and boron trifluoride; and solid acids such as silicotungstic acid, phosphotungstic acid, silicomolybdic acid and phosphomolybdic acid.

Among these, from the viewpoint of the productivity, preferable are sulfuric acid, oxalic acid, citric acid, p-toluenesulfonic acid, methanesulfonic acid, trifluoromethanesulfonic acid, benzenesulfonic acid, naphthalenesulfonic acid, naphthalenedisulfonic acid and phosphotungstic acid. The acidic catalyst is used singly or in combinations of two or more.

The amount of an acidic catalyst used is not particularly limited, but is, based on 100 parts by mass of the total amount of a compound represented by the above formula (1) and formaldehyde, preferably 0.0001 to 100 parts by mass, more preferably 0.001 to 85 parts by mass, and still more preferably 0.001 to 70 parts by mass. By adjusting the amount of an acidic catalyst used in such a range, a more proper reaction rate can be achieved and an increase in the resin viscosity due to the highness of the reaction rate can be prevented more effectively.

A method of adding an acidic catalyst to a reaction system is not particularly limited, and the acidic catalyst may be added collectively or dividedly.

The pressure of the condensation reaction in the present embodiment is not particularly limited, and may be normal pressure or a pressurized pressure, that is, a pressure higher than normal pressure.

A method of the condensation reaction in the present embodiment is not particularly limited, and an example thereof includes a method of carrying out the condensation reaction while raw materials to be used and an acidic catalyst are heated to reflux at a temperature or higher (for example, usually 80 to 300° C.) at which the raw materials become compatible with one another, or produced water is distilled away, under normal pressure. In the condensation reaction in the present embodiment, as required, an inert gas such as nitrogen, helium or argon may be passed in the reaction system.

In the condensation reaction in the present embodiment, as required, a solvent inactive to the condensation reaction may be used. Examples of such a solvent include aromatic hydrocarbons such as toluene, ethylbenzene and xylene; saturated aliphatic hydrocarbons such as heptane and hexane; cycloaliphatic hydrocarbons such as cyclohexane; ethers such as dioxane and dibutyl ether; alcohols such as 2-propanol; ketones such as methyl isobutyl ketone; carboxylate esters such as ethyl propionate; and carboxylic acids such as acetic acid. The solvent inactive to the condensation reaction is used singly or in combinations of two or more.

The condensation reaction in the present embodiment is not particularly limited, but is preferably carried out in the presence of an alcohol. When an alcohol is present, the terminals of the resin are sealed with the alcohol, and the aromatic hydrocarbon formaldehyde resin having a lower molecular weight and a lower dispersion (that is, the molecular weight distribution is narrower, further in other words, the value of the weight-average molecular weight/number-average molecular weight (Mw/Mn) is smaller) can be obtained. As a result, the aromatic hydrocarbon formaldehyde resin according to the present embodiment is a resin better in the solvent solubility and low in the melt viscosity also after modification. The alcohol is not particularly limited, and examples thereof include monools having 1 to 12 carbon atoms and diols having 1 to 12 carbon atoms. The alcohol may be used singly or in combinations of two or more. Among these, from the viewpoint of the productivity of the aromatic hydrocarbon formaldehyde resin, preferable are propanol, butanol, octanol and 2-ethylhexanol.

In the case where an alcohol is present, the amount of the alcohol added is not particularly limited, but is preferably, for example, such an amount that the hydroxyl group of the alcohol is 1 to 10 equivalents based on 1 equivalent of hydroxymethyl groups in a compound represented by the above formula (1).

In the condensation reaction in the present embodiment, a hydroxymethyl-substituted aromatic hydrocarbon compound, formaldehyde and an acidic catalyst may be added simultaneously to a reaction system, or a hydroxymethyl-substituted aromatic hydrocarbon compound may be successively added to a system in which formaldehyde and an acidic catalyst are present. The successive addition method is preferable from the viewpoint that the oxygen content in an obtained aromatic hydrocarbon formaldehyde resin can be increased, and in the case where the resin is modified later (hereinafter, this step of the modification is referred to as "modification step"), the resin can be reacted more with compounds represented by the following formulae (2) and (3).

The reaction time of the condensation reaction is not particularly limited, but is preferably 0.5 to 30 hours, more preferably 0.5 to 20 hours, and still more preferably 0.5 to 10 hours. By adjusting the reaction time in such a range, an aromatic hydrocarbon formaldehyde resin excellent in the thermal decomposition resistance can be obtained more economically and industrially more advantageously.

The reaction temperature of the condensation reaction is not particularly limited, but is preferably 80 to 300° C., more preferably 85 to 270° C., and still more preferably 90 to 240° C. By adjusting the reaction temperature in such a range, an aromatic hydrocarbon formaldehyde resin can be obtained more economically and industrially more advantageously.

After the termination of the reaction, as required, the solvent inactive to the condensation reaction is further added in and dilutes the system; and thereafter, the system is allowed to stand still to be thereby separated into two phases. Then, a water phase is removed and a resin phase being an oil phase is obtained; and the resin phase is washed with water to sufficiently remove the acidic catalyst from the resin phase. Thereafter, the added solvent and the unreacted raw materials are removed from the resin phase by a usual method such as distillation to thereby obtain an aromatic hydrocarbon formaldehyde resin according to the present embodiment.

The aromatic hydrocarbon formaldehyde resin to be obtained by the above reaction, from the viewpoint of the balance of the oxygen content and the heat resistance, preferably has a structure in which at least part of aromatic rings is crosslinked with a bond represented by the following formula (i) and/or a bond represented by the following formula (ii).

$$—(CH_2)_p— \qquad (i)$$

$$—CH_2—A— \qquad (ii)$$

wherein in the formula (i), p represents an integer of 1 to 10; and in the formula (ii), A represents a divalent group represented by $(OCH_2)_m$, and m represents an integer of 1 to 10.

In this preferred embodiment, at least part of aromatic rings may be crosslinked with a bond in which a bond represented by $—(CH_2)_p—$ and a bond represented by $—(OCH_2)_m—$ are randomly sequenced, for example, $—CH_2—OCH_2—CH_2—$, $—(CH_2)_2—OCH_2—$, and $—CH_2—OCH_2—OCH_2—CH_2—$.

In the aromatic hydrocarbon formaldehyde resin according to the present embodiment, from the viewpoint of the thermal decomposition resistance and the solubility to the solvent, the number-average molecular weight (Mn) in terms of polystyrene as measured by gel permeation chromatography (hereinafter, represented as "GPC") analysis is, not particularly limited, but preferably 200 to 4,000, more preferably 250 to 3,500, and still more preferably 300 to 4,000.

In the aromatic hydrocarbon formaldehyde resin according to the present embodiment, from the viewpoint of the thermal decomposition resistance and the solubility to the solvent, the weight-average molecular weight (Mw) in terms of polystyrene as measured by GPC is, not particularly limited, but preferably 200 to 25,000, more preferably 250 to 20,000, and still more preferably 300 to 15,000.

In the aromatic hydrocarbon formaldehyde resin according to the present embodiment, from the viewpoint of the thermal decomposition resistance and the melt viscosity, the degree of dispersion (Mw/Mn) is, not particularly limited, but preferably 1.0 to 5.0, more preferably 1.1 to 4.5, and still more preferably 1.2 to 4.0.

In the aromatic hydrocarbon formaldehyde resin according to the present embodiment, from the viewpoint of the thermal decomposition resistance, and the reactivity with compounds represented by the following formulae (2) and (3) in a modification step described later, the oxygen content is, not particularly limited, but preferably 7 to 18% by mass, more preferably 7 to 17% by mass, and still more preferably 8 to 17% by mass. Since the reactivity of a modification reaction in the modification step described later is increased in proportion to the oxygen content in the resin, by adjusting the oxygen content in such a range, the compounds represented by the following formulae (2) and (3) can be more reacted. Here, the oxygen content in the resin is measured by an organic elemental analysis.

In the aromatic hydrocarbon formaldehyde resin according to the present embodiment, from the viewpoint of the thermal decomposition resistance and the handling, the resin is, not particularly limited, but preferably liquid at normal temperature (25° C.). From the same viewpoint, the softening point of the aromatic hydrocarbon formaldehyde resin is preferably 140° C. or lower, more preferably 130° C. or lower, and still more preferably 120° C. or lower. Here, the lower limit of the softening point is not particularly limited. In the present description, the softening point is measured according to a method described in Examples.

In the aromatic hydrocarbon formaldehyde resin according to the present embodiment, from the viewpoint of the thermal decomposition resistance and the solubility to the solvent, the hydroxyl value is, not particularly limited, but preferably 0 to 100 mgKOH/g, more preferably 5 to 95 mgKOH/g, and still more preferably 10 to 90 mgKOH/g. In the present description, the hydroxyl value is measured according to a method described in Examples.

The aromatic hydrocarbon formaldehyde resin according to the present embodiment preferably contains substantially no diarylmethane. Here, "contains substantially no diarylmethane" means that in GPC analysis according to a method described in Examples described later, no peaks of diarylmethanes are detected.

<Modified Aromatic Hydrocarbon Formaldehyde Resin>

A modified aromatic hydrocarbon formaldehyde resin according to the present embodiment is obtained by heating and reacting the above aromatic hydrocarbon formaldehyde resin according to the present embodiment with at least one selected from the group consisting of compounds represented by the following formula (2) and (3) in the presence of an acidic catalyst.

In the present embodiment, this reaction is referred to as "modification reaction".

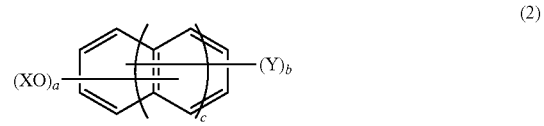
(2)

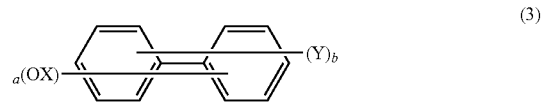
(3)

wherein X and Y each independently represent a hydrogen atom or an organic group having 1 to 10 carbon atoms; and a and b represent integers satisfying $1 \leq a+b \leq 10$, $a \geq 1$ and $b \geq 0$, and c represents an integer of 0 to 2. The compound represented by the above formula (2) is used singly or in combinations of two or more.

In the above formula (2), from the viewpoint of the productivity, X and Y are each independently preferably a hydrogen atom, an alkyl group having 6 to 10 carbon atoms, an aryl group having 6 to 10 carbon atoms, or a cyclohexyl group, and more preferably a hydrogen atom, an alkyl group having 1 to 4 carbon atoms, an aryl group having 6 to 10 carbon atoms, or a cyclohexyl group; and it is preferable that a and b are each independently 1 to 2, and c is 0 to 2. Further from the viewpoint of easily providing an epoxy resin described later, X is still more preferably a hydrogen atom.

Specific examples of the compound represented by the above formula (2) include phenol, methoxyphenol, benzoxyphenol, catechol, resorcinol, hydroquinone, cresol, phenylphenol, naphthol, methoxynaphthol, benzoxynaphthol, dihydroxynaphthalene, hydroxyanthracene, methoxyanthracene, benzoxyanthracene and dihydroxyanthracene. Among these, from the viewpoint of easy availability, preferable are phenol, cresol, catechol, hydroquinone, phenylphenol, naphthol, dihydroxynaphthalene, hydroxyanthracene and dihydroxyanthracene, and more preferable are phenol and naphthol.

Further as the compound represented by the above formula (2), from the viewpoint of being excellent in the thermal decomposition resistance, more preferable phenol derivatives are phenol, phenylphenol, naphthol, methoxynaphthol, benzoxynaphthol, dihydroxynaphthalene, hydroxyanthracene, methoxyanthracene, benzoxyanthracene and dihydroxyanthracene.

Further among these, those having a hydroxy group are, since being excellent in crosslinkability with an acid crosslinking agent, still more preferable; and particularly preferable are phenol, phenylphenol, naphthol, dihydroxynaphthalene, hydroxyanthracene and dihydroxyanthracene.

In the above formula (3), from the viewpoint of the productivity, X and Y are each independently preferably a hydrogen atom, an alkyl group having 6 to 10 carbon atoms, an aryl group having 6 to 10 carbon atoms, or a cyclohexyl group, and more preferably a hydrogen atom, an alkyl group having 1 to 4 carbon atoms, an aryl group having 6 to 10 carbon atoms, or a cyclohexyl group; and it is preferable that a and b are each independently 1 to 2, and c is 0 to 2. Further from the viewpoint of easily providing an epoxy resin described later, X is still more preferably a hydrogen atom.

Specific examples of the compound represented by the above formula (3) include biphenol, methoxybiphenol and benzoxybiphenol. Among these, from the viewpoint of being easy availability, biphenol is preferable.

The amount of the compounds used represented by the above formulae (2) and (3) is, based on 1 mol of oxygen atoms of the aromatic hydrocarbon formaldehyde resin, preferably 0.1 to 5 mol, more preferably 0.2 to 4 mol, and still more preferably 0.3 to 3 mol. By adjusting the amount of the compounds used represented by the above formulae (2) and (3) in such a range, the yield of an obtained modified aromatic hydrocarbon formaldehyde resin can be maintained higher, and the amount of the compounds represented by the above formulae (2) and (3) which remain as unreacted substances can be made smaller.

The molecular weight of the modified aromatic hydrocarbon formaldehyde resin receives the influences of the number of moles of oxygen atoms (hereinafter, referred to as "the number of moles of oxygen contained") of the aromatic hydrocarbon formaldehyde resin and of the amount of the compounds used represented by the above formulae (2) and (3). When the both of them increase, the molecular weight of the modified aromatic hydrocarbon formaldehyde resin reduces.

Here, the number of moles of oxygen contained can be calculated by measuring an oxygen content (% by mass) in the aromatic hydrocarbon formaldehyde resin by an organic elemental analysis and according to the following calculation expression.

Number of moles of oxygen contained (mol)
=amount of the aromatic hydrocarbon formaldehyde resin (g) used×oxygen content (% by mass)/16

The acidic catalyst usable in the above modification reaction in the present embodiment is not particularly limited, and can suitably be selected from well-known inorganic acids and organic acids. Examples of the acidic catalyst include inorganic acids such as hydrochloric acid, sulfuric acid, phosphoric acid, hydrobromic acid and hydrofluoric acid; organic acids such as oxalic acid, malonic acid, succinic acid, adipic acid, sebacic acid, citric acid, fumaric acid, maleic acid, formic acid, p-toluenesulfonic acid, methanesulfonic acid, trifluoroacetic acid, dichloroacetic acid, trichloroacetic acid, trifluoromethanesulfonic acid, benzenesulfonic acid, naphthalenesulfonic acid and naphthalenedisulfonic acid; Lewis acids such as zinc chloride, aluminum chloride, iron chloride and boron trifluoride, and solid acids such as silicotungstic acid, phosphotungstic acid, silicomolybdic acid and phosphomolybdic acid. Among these, from the viewpoint of the environmental problem and the productivity, preferable are sulfuric acid, oxalic acid, citric acid, p-toluenesulfonic acid, methanesulfonic acid, trifluoromethanesulfonic acid, benzenesulfonic acid, naphthalenesulfonic acid, naphthalenedisulfonic acid and phosphotungstic acid. The acidic catalyst is used singly or in combinations of two or more.

The amount of the acidic catalyst used is not particularly limited, but is, based on 100 parts by mass of the aromatic hydrocarbon formaldehyde resin, preferably 0.0001 to 100 parts by mass, more preferably 0.001 to 85 parts by mass, and still more preferably 0.001 to 70 parts by mass. By adjusting the amount of the acidic catalyst used in such a range, a more proper reaction rate can be achieved, and an increase in the resin viscosity due to the high reaction rate can be prevented more effectively. The acidic catalyst may be placed collectively or dividedly in a reaction system.

A method of the above modification reaction in the present embodiment is not particularly limited. The method, for example, involves that the modification reaction is carried out while raw materials to be used and an acidic catalyst are heated to reflux at a temperature or higher (for example, usually 80 to 300° C.) at which the raw materials become compatible with one another, or produced water is distilled away, in the presence of an acidic catalyst and at normal pressure. The pressure in the modification reaction may be normal pressure, or may be a pressurized pressure, that is, a pressure higher than normal pressure. In the modification reaction, as required, an inert gas such as nitrogen, helium or argon may be passed in a reaction system.

In the modification reaction in the present embodiment, as required, a solvent inactive to the condensation reaction may be used. Examples of such a solvent include aromatic hydrocarbons such as toluene, ethylbenzene and xylene; saturated aliphatic hydrocarbons such as heptane and hexane; cycloaliphatic hydrocarbons such as cyclohexane; ethers such as dioxane and dibutyl ether; alcohols such as 2-propanol; ketones such as methyl isobutyl ketone; carboxylate esters such as ethyl propionate; and carboxylic acids such as acetic acid. The solvent inactive to the condensation reaction is used singly or in combinations of two or more.

The reaction time of the modification reaction in the present embodiment is not particularly limited, but is preferably 0.5 to 20 hours, more preferably 1 to 15 hours, and still more preferably 2 to 10 hours. By adjusting the reaction time in such a range, a modified aromatic hydrocarbon formaldehyde resin excellent in the thermal decomposition resistance and the solubility to the solvent can be obtained more economically and industrially more advantageously.

The reaction temperature of the modification reaction in the present embodiment is not particularly limited, but is preferably 80 to 300° C., more preferably 85 to 270° C., and still more preferably 90 to 240° C. By adjusting the reaction temperature in such a range, a modified aromatic hydrocarbon formaldehyde resin excellent in the thermal decomposition resistance can be obtained more economically and industrially more advantageously.

After the termination of the modification reaction, as required, the solvent inactive to the condensation reaction is further added in and dilutes the system; and thereafter, the system is allowed to stand still to be thereby separated into two phases. Then, a water phase is removed and a resin phase being an oil phase is obtained; further, the resin phase is washed with water to sufficiently remove the acidic catalyst from the resin phase. Thereafter, the added solvent and the unreacted raw materials are removed from the resin phase by a usual method such as distillation to thereby obtain a modified aromatic hydrocarbon formaldehyde resin according to the present embodiment.

In the modified aromatic hydrocarbon formaldehyde resin according to the present embodiment, as compared with the aromatic hydrocarbon formaldehyde resin before the modification, the thermal decomposition resistance (thermogravimetric loss rate) and the hydroxyl value are raised. For example, when the modification is carried out under the conditions of an amount of the acidic catalyst used of 0.05 parts by mass, a reaction time of 5 hours, and a reaction temperature of 200° C., the thermal decomposition resistance (thermogravimetric loss rate) is increased by about 1 to 50%, and the hydroxyl value is increased by about 1 to 300 mgKOH/g. Here, the "thermogravimetric loss rate" is measured according to a method described in Examples.

In the modified aromatic hydrocarbon formaldehyde resin according to the present embodiment, from the viewpoint of the thermal decomposition resistance and the solubility to the solvent, the number-average molecular weight (Mn) in terms of polystyrene as measured by GPC analysis is, not particularly limited, but preferably 200 to 4,000, more preferably 250 to 3,500, and still more preferably 300 to 3,000.

In the modified aromatic hydrocarbon formaldehyde resin according to the present embodiment, from the viewpoint of the thermal decomposition resistance and the solubility to the solvent, the weight-average molecular weight (Mw) in terms of polystyrene as measured by GPC analysis is, not particularly limited, but preferably 200 to 25,000, more preferably 250 to 20,000, and still more preferably 300 to 150,000.

In the modified aromatic hydrocarbon formaldehyde resin according to the present embodiment, from the viewpoint of the thermal decomposition resistance and the solubility to the solvent, the degree of dispersion (Mw/Mn) is, not particularly limited, but preferably 1.0 to 5.0, more preferably 1.1 to 4.5, and still more preferably 1.2 to 4.0.

In the modified aromatic hydrocarbon formaldehyde resin according to the present embodiment, from the viewpoint of the thermal decomposition resistance and the handling, the softening point is, not particularly limited, but preferably 50° C. to 240° C., more preferably 60 to 230° C., and still more preferably 70 to 220° C.

In the modified aromatic hydrocarbon formaldehyde resin according to the present embodiment, from the viewpoint of the thermal decomposition resistance and the solubility to the solvent, the hydroxyl value is, not particularly limited, but preferably 60 to 380 mgKOH/g, more preferably 70 to 370 mgKOH/g, and still more preferably 80 to 360 mgKOH/g.

<Epoxy Resin>

An epoxy resin according to the present embodiment is obtained by reacting the modified aromatic hydrocarbon formaldehyde resin with epichlorohydrin. The amount of epichlorohydrin used is, based on 1 mol of hydroxyl groups of the modified aromatic hydrocarbon formaldehyde resin, preferably 0.8 to 2 mol, and more preferably 0.9 to 1.2 mol. By adjusting the amount of epichlorohydrin used in such a range, the yield of an obtained epoxy resin can be maintained higher.

The reaction of the modified aromatic hydrocarbon formaldehyde resin with epichlorohydrin is carried out in the presence of an alkaline metal hydroxide. The alkaline metal hydroxide is not particularly limited, and examples thereof include sodium hydroxide and potassium hydroxide. Among these, from the viewpoint of the economic efficiency, sodium hydroxide is preferable. The alkaline metal hydroxide is used singly or in combinations of two or more.

The amount of the alkaline metal hydroxide used is not particularly limited, but is, based on 100 parts by mass of the modified aromatic hydrocarbon formaldehyde resin, preferably 10 to 150 parts by mass, and more preferably 20 to 100 parts by mass. By adjusting the amount of the alkaline metal hydroxide used in such a range, the effect of completing the ring-closure reaction can be achieved. The alkaline metal hydroxide may be placed collectively or dividedly in a reaction system.

A method of the reaction of the modified aromatic hydrocarbon formaldehyde resin with epichlorohydrin in the present embodiment is not particularly limited, but an example thereof includes a method in which a resin is dissolved in an excessive amount of epichlorohydrin, and thereafter, the reaction is carried out in the presence of an alkaline metal hydroxide such as sodium hydroxide at 60 to 120° C. for 1 to 10 hours.

In the reaction of the modified aromatic hydrocarbon formaldehyde resin according to the present embodiment with epichlorohydrin, as required, a solvent inactive to the reaction may be used. Examples of such a solvent include hydrocarbons such as heptane and toluene, and alcohols such as ethanol, propanol and butanol. These solvents are used singly or in combinations of two or more.

The reaction time of the modification reaction in the present embodiment is not particularly limited, but is preferably 0.5 to 20 hours, more preferably 1 to 15 hours, and still more preferably 2 to 10 hours. By adjusting the reaction time in such a range, a modified aromatic hydrocarbon formaldehyde resin excellent in the thermal decomposition resistance and the solubility to the solvent can be obtained more economically and industrially more advantageously.

The reaction temperature of the reaction of the modified aromatic hydrocarbon formaldehyde resin with epichlorohydrin in the present embodiment is not particularly limited, but is preferably 50 to 150° C., and more preferably 60 to 120° C. By adjusting the reaction temperature in such a range, an epoxy resin can be obtained more economically and industrially more advantageously.

The epoxy resin according to the present embodiment is not particularly limited, but is, from the viewpoint of the reactivity, preferably one containing at least one selected from the group consisting of structures represented by the following formulae (11) and (12).

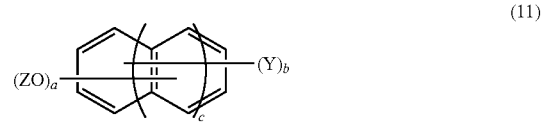

(11)

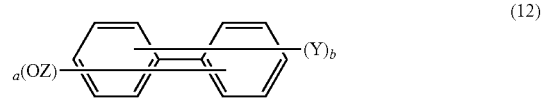

(12)

wherein Y is the same in the above formula (2); Z represents a glycidyl group, an aryl group having 6 to 10 carbon atoms or a cyclohexyl group; and a and b represent integers satisfying $1 \leq a+b \leq 10$, $a \geq 1$ and $b \geq 0$, and c represents an integer of 0 to 2.

In the epoxy resin according to the present embodiment, the epoxy equivalent is, not particularly limited, but preferably 150 to 1,000 g/eq, and more preferably 200 to 500 g/eq. By adjusting the epoxy equivalent in the above range, the effect of well balancing the moisture absorption rate and the curability tends to be more effectively achieved. The epoxy equivalent is measured according to a method described in following Examples.

In the epoxy resin according to the present embodiment, the content of a hydrolyzable halogen, which may cause corrosion of wiring, can be more reduced. Specifically, the content of the hydrolyzable halogen contained in the epoxy resin according to the present invention is, based on 100 parts by mass of the epoxy resin, preferably 2,000 ppm or lower, more preferably 1,000 ppm or lower, and still more preferably 750 ppm or lower. The content of the hydrolyzable halogen is measured according to a method described in following Examples.

The aromatic hydrocarbon formaldehyde resin according to the present embodiment is, since being one in which diarylmethanes formed from two molecules of aromatic hydrocarbons and one molecule of formaldehyde are sufficiently decreased, excellent in the reactivity in the modification and the thermal decomposition resistance. Therefore, the modified aromatic hydrocarbon formaldehyde resin obtained by modifying the aromatic hydrocarbon formaldehyde resin is capable of being utilized in broad applications including electric insulating materials, resist resins, semiconductor sealing resins, printed wiring board adhesives, matrix resins for electric laminated plates mounted on electric devices, electronic devices, industrial devices and the like, build-up laminated plate materials, fiber-reinforced plastic resins, sealing resins for liquid crystal display panels, coating materials, various types of coating agents, adhesives, coating agents for semiconductors and resist resins in the semiconductor production.

EXAMPLES

Hereinafter, the present invention will be described in more detail, but the present invention is not limited to these Examples.

<Molecular Weight>

The weight-average molecular weight (Mw) and the number-average molecular weight (Mn) in terms of polystyrene were determined by GPC analysis, and the degree of dispersion (Mw/Mn) was determined therefrom. The apparatus and the analysis condition used in the analysis were as follows.

Apparatus: Shodex GPC-101 (manufactured by Showa Denko K.K., product name)

Column: LF-804×3

Eluate: THF 1 mL/min

Temperature: 40° C.

<Presence Ratio of the Diarylmethane in the Resin>

The presence ratio of the diarylmethane was calculated using the following calculation expression from values acquired from GPO analysis.

Calculation expression: an integrated value of the peak of the diarylmethane/an integrated value of the peaks of the whole resin×100(%)

<Contents of Carbon and Oxygen in the Resin>

The contents (% by mass) of carbon and oxygen in the resin were measured by an organic elemental analysis. Further the number of moles of oxygen contained per g of the resin was calculated according to the following calculation expression. An apparatus used in the analysis was as follows.

Apparatus: CHN Corder MT-6 (manufactured by Yanako Bunseki Kogyo KK, product name)

Calculation expression: number of moles of oxygen contained per g of the resin (mol/g)=oxygen content (% by mass)/16

<Hydroxyl Value>

The hydroxyl value was measured according to JIS K1557.

<Epoxy Equivalent>

The epoxy equivalent was measured according to JIS K7236.

<Content of the Hydrolyzable Halogen>

1.0 g of a sample was weighed in a beaker; and 30 mL of dioxane was added and the sample was completely dissolved. 5 mL of a 1N alcoholic KOH was added thereto by a whole pipette; thereafter, a cooling tube is attached to the beaker, and boiling reflux was carried out in an oil bath for 30 minutes. The 1N alcoholic KOH was beforehand prepared by weighing 56.1 g of potassium hydroxide in a 1-L messflask and dissolving it in a 95.0% ethanol. Thereafter, the beaker is cooled, and 5 mL of methanol and 100 m L of a 80% acetone-water solution were added. Then, a stirrer bar was put in the beaker; 2 mL of nitric acid was added; and the solution was titrated with a 0.01N silver nitrate reference solution by a potentiometric titration apparatus. The content of the hydrolyzable halogen in the sample was calculated by the following expression.

A content of the hydrolyzable halogen (ppm)=(($A$−$B$)×35.5×$N$×$F$×1000)/$W$ wherein A: an amount (mL) of the 0.01N silver nitrate reference solution taken for the titration of the sample, B: an amount (mL) of the 0.01N silver nitrate reference solution taken for the titration in a blank test, N: a normality of the silver nitrate reference solution, F: a titer of the silver nitrate reference solution, and W: a sample weight (g).

Example 1

Biphenylmethanol Formaldehyde Resin 584 g of a 37% by mass of formalin aqueous solution (7.2 mol as formaldehyde, manufactured by Mitsubishi Gas Chemical Co., Ltd.) and 324 g of a 98% by mass of sulfuric acid (manufactured by Mitsubishi Gas Chemical Co., Ltd.) were placed in a 2 L-internal volume four-neck flask having an outlet at the bottom equipped with a Dimroth condenser, a thermometer and a stirring blade in a nitrogen gas flow. 294.4 g of a melted 4-biphenylmethanol (1.59 mol, manufactured by Mitsubishi Gas Chemical Co., Ltd.) was dropped thereto over 5 hours at normal pressure at about 100° C. under reflux and stirring, and allowed to react further for 1 hour. Then, 600 g of ethylbenzene (manufactured by Wako Pure Chemical Industries, Ltd.) as diluting solvents were added thereto, and allowed to stand still; thereafter, an oil phase as a separated upper phase was left and a water phase as a lower phase was removed. The oil phase was further neutralized and washed with water; and ethylbenzene, the unreacted raw materials and the like were distilled away under reduced pressure to thereby obtain 255 g of a white solid biphenylmethanol formaldehyde resin.

As a result of GPC analysis of the obtained resin, Mn was 482; Mw was 619; and Mw/Mn was 1.29. Further as a result of an organic elemental analysis of the resin, the carbon content was 82.3% by mass; and the oxygen content was 11.3% by mass (the number of moles of oxygen contained per g of the resin was 0.0071 mol/g). Further the hydroxyl value of the resin was 21 mgKOH/g. Here, in the resin, no diarylmethane represented by the above formula (3) was detected.

Example 2

Modified Biphenylmethanol Formaldehyde Resin 90.0 g of the biphenylmethanol formaldehyde resin (number of moles of oxygen contained: 0.63 mol) obtained in Example 1, and 118 g of phenol (1.26 mol, manufactured by Wako Pure Chemical Industries, Ltd.) were placed in a 0.5 L-internal volume four-neck flask equipped with a Liebig condenser, a thermometer and a stirring blade in a nitrogen gas flow, and heated and melted at 95° C.; thereafter, 21 mg of paratoluenesulfonic acid (manufactured by Wako Pure Chemical Industries, Ltd.) was added under stirring, and started to be allowed to react. The reaction solution was heated up to 150° C., and allowed to react for 3 hours. After the termination of the reaction, 400 g of a mixed solvent (metaxylene (manufactured by Mitsubishi Gas Chemical Co., Ltd.)/methyl isobutyl ketone (manufactured by Wako Pure Chemical Industries, Ltd.)=1/1 (mass ratio)) was added thereto to dilute the reaction solution, which was then neutralized and washed with water; and the solvent, the unreacted raw materials and the like were removed under reduced pressure to thereby obtain 144 g of a yellow solid modified biphenylmethanol formaldehyde resin.

As a result of GPC analysis of the obtained resin, Mn was 602; Mw was 794; and Mw/Mn was 1.32. Further the hydroxyl value of the resin was 291 mgKOH/g. Here, in the resin, no diarylmethane represented by the above formula (4) was detected.

Example 3

Modified Biphenylmethanol Formaldehyde Resin 120.0 g of the biphenylmethanol formaldehyde resin (number of moles of oxygen contained: 0.86 mol) obtained in Example 1, and 80 g of phenol (0.86 mol, manufactured by Wako Pure Chemical Industries, Ltd.) were placed in a 0.5 L-internal volume four-neck flask equipped with a Liebig condenser, a thermometer and a stirring blade in a nitrogen gas flow, and heated and melted at 95° C.; thereafter, 20 mg of paratoluenesulfonic acid (manufactured by Wako Pure Chemical Industries, Ltd.) was added under stirring, and started to be allowed to react. The reaction solution was heated up to 150° C., and allowed to react for 3 hours. After the termination of the reaction, 400 g of a mixed solvent (metaxylene (manufactured by Mitsubishi Gas Chemical Co., Ltd.)/methyl isobutyl ketone (manufactured by Wako Pure Chemical Industries, Ltd.)=1/1 (mass ratio)) was added thereto to dilute the reaction solution, which was then neutralized and washed with water; and the solvent, the unreacted raw materials and the like were removed under reduced pressure to thereby obtain 140 g of a yellow solid modified biphenylmethanol formaldehyde resin.

As a result of GPC analysis of the obtained resin, Mn was 1008; Mw was 2342; and Mw/Mn was 2.32. Further the hydroxyl value of the resin was 244 mgKOH/g. Here, in the resin, no diarylmethane represented by the above formula (4) was detected.

Example 4

Modified Biphenylmethanol Formaldehyde Resin 90.0 g of the biphenylmethanol formaldehyde resin (number of moles of oxygen contained: 0.63 mol) obtained in Example 1, and 183 g of 1-naphthol (1.26 mol, manufactured by Sugai Chemical Industry Co., Ltd.) were placed in a 0.5 L-internal volume four-neck flask equipped with a Liebig condenser, a thermometer and a stirring blade in a nitrogen gas flow, and heated and melted at 90° C.; thereafter, 55 mg of paratoluenesulfonic acid (manufactured by Wako Pure Chemical Industries, Ltd.) was added under stirring, and started to be allowed to react. The reaction solution was heated up to 170° C., and allowed to react for 3 hours. After the termination of the reaction, 400 g of a mixed solvent (metaxylene (manufactured by Mitsubishi Gas Chemical Co., Ltd.)/methyl isobutyl ketone (manufactured by Wako Pure Chemical Industries, Ltd.)=1/1 (mass ratio)) was added thereto to dilute the reaction solution, which was then neutralized and washed with water; and the solvent, the unreacted raw materials were removed under reduced pressure to thereby obtain 187 g of a blackish brown solid modified biphenylmethanol formaldehyde resin.

As a result of GPC analysis of the obtained resin, Mn was 558; Mw was 700; and Mw/Mn was 1.26. Further the hydroxyl value of the resin was 230 mgKOH/g. Here, in the resin, no diarylmethane represented by the above formula (4) was detected.

Example 5

Modified Biphenylmethanol Formaldehyde Resin 100.0 g of the biphenylmethanol formaldehyde resin (number of moles of oxygen contained: 0.70 mol) obtained in Example 1, and 101 g of 1-naphthol (0.70 mol, manufactured by Sugai Chemical Industry Co., Ltd.) were placed in a 0.5 L-internal volume four-neck flask equipped with a Liebig condenser, a thermometer and a stirring blade in a nitrogen gas flow, and heated and melted at 90° C.; thereafter, 40 mg of paratoluenesulfonic acid (manufactured by Wako Pure Chemical Industries, Ltd.) was added under stirring, and started to be allowed to react. The reaction solution was heated up to 170° C., and allowed to react for 3 hours. After the termination of the reaction, 400 g of a mixed solvent (metaxylene (manufactured by Mitsubishi Gas Chemical Co., Ltd.)/methyl isobutyl ketone (manufactured by Wako Pure Chemical Industries, Ltd.)=1/1 (mass ratio)) was added thereto to dilute the reaction solution, which was then neutralized and washed with water; and the solvent, the unreacted raw materials were removed under reduced pressure to thereby obtain 177 g of a blackish brown solid modified biphenylmethanol formaldehyde resin.

As a result of GPC analysis of the obtained resin, Mn was 820; Mw was 1234; and Mw/Mn was 1.50. Further the hydroxyl value of the resin was 202 mgKOH/g. Here, in the resin, no diarylmethane represented by the above formula (4) was detected.

Comparative Example 1

Biphenyl Formaldehyde Resin 236.9 g of a 37% by mass of formalin aqueous solution (2.9 mol as formaldehyde, manufactured by Mitsubishi Gas Chemical Co., Ltd.) and 163.4 g of a 98% by mass of sulfuric acid (manufactured by Kanto Chemical Co., Inc.) were placed in a 2 L-internal volume four-neck flask having an outlet at the bottom equipped with a Dimroth condenser, a thermometer and a stirring blade in a nitrogen gas flow. 100.0 g of biphenyl (0.65 mol, manufactured by Wako Pure Chemical Industries, Ltd.) was dropwise added over 3 hours under stirring and reflux at normal pressure and at 100° C., and thereafter allowed to react further for 3 hours. Then, 200 g of ethylbenzene (manufactured by Kanto Chemical Co., Inc.) as a diluting solvent was added and allowed to stand still; thereafter, an oil phase as a separated upper phase was left and a water phase as a lower phase was removed. Further the oil phase was neutralized and washed with water; and ethylbenzene was distilled away under reduced pressure to thereby obtain 65.1 g of a colorless transparent biphenyl formaldehyde resin.

As a result of GPC analysis of the obtained resin, Mn was 342; Mw was 414; and Mw/Mn was 1.21. Further as a result of an organic elemental analysis of the resin, the carbon content was 83.8% by mass; and the oxygen content was 9.2% by mass (the number of moles of oxygen contained per g of the resin was 0.0058 mol/g). Further the hydroxyl value thereof was 18 mgKOH/g. Here, in the resin, the presence ratio of the diarylmethane represented by the above formula (4) was 19%.

Comparative Example 2

Modified Biphenyl Formaldehyde Resin 50.0 g of the resin (number of moles of oxygen contained: 0.29 mol) obtained in Comparative Example 1, and 54.1 g of phenol (0.58 mol, manufactured by Tokyo Chemical Industry Co., Ltd.) were placed in a 1.0 L-internal volume four-neck flask equipped with a Liebig condenser, a thermometer and a stirring blade in a nitrogen gas flow, and heated and melted at 120° C.; thereafter, 10.4 mg of para-toluenesulfonic acid (manufactured by Wako Pure chemical Industries, Ltd.) was added under stirring to start to be allowed to react. The reaction solution was immediately heated up to 190° C., and stirred for 3 hours; thereafter, 200 g of a mixed solvent (metaxylene (Mitsubishi Gas Chemical Co., Ltd.)/methyl isobutyl ketone (Kanto Chemical Co., Ltd.)=1/1 (mass ratio)) was added thereto to dilute the reaction solution, which was then neutralized and washed with water; and the solvent was removed under reduced pressure to thereby obtain 73.0 g of a blackish brown modified biphenyl formaldehyde resin.

As a result of GPC analysis of the obtained resin, Mn was 420; Mw was 706; and Mw/Mn was 1.68. Further the hydroxyl value of the resin was 204 mgKOH/g. Here, in the resin, the presence ratio of the diarylmethane represented by the above formula (4) was 5%.

Epoxy Resin

Example 6

Biphenyl-Based Epoxy Resin 150.0 g of the modified biphenylmethanol formaldehyde resin obtained in Example 5, 434.0 g of epichlorohydrin, and 170.0 g of isopropyl alcohol were placed in a 2 L-internal volume four-neck flask equipped with a cooling tube, a thermometer and a stirring device, and heated to 40° C. to be homogeneously dissolved; and thereafter, 74 g of a 48.5% by mass of sodium hydroxide aqueous solution was dropped therein over 60 minutes. During that, the temperature of the system was gradually raised so that the temperature in the system arrives at 65° C. after the termination of the dropping. Thereafter, the temperature was held at 65° C. for 30 minutes and the reaction was completed; then, by-produced salts and excessive sodium hydroxide were removed by washing with water. Then, excessive epichlorohydrin and isopropyl alcohol were distilled away under reduced pressure from the reaction product to thereby obtain a crude epoxy resin. The crude epoxy resin was dissolved in 300 g of methyl isobutyl ketone; 5 g of a 48.5% by mass of sodium hydroxide aqueous solution was added and allowed to react at 65° C. for 1 hour. Thereafter, a sodium phosphate aqueous solution was added to the reaction solution to neutralize excessive sodium hydroxide, and by-produced salts were removed by washing with water. Then, methyl isobutyl ketone was completely removed under reduced pressure to thereby obtain 170 g of an epoxy resin as a target. The epoxy equivalent of the obtained epoxy resin was 250 g/eq, and the content of the hydrolyzable halogen was 400 ppm.

From the above results, it is clear that the aromatic hydrocarbon formaldehyde resin and the modified aromatic hydrocarbon formaldehyde resin obtained in the present embodiment contained more sufficiently decreased diarylmethanes being nonreactive dimers than aromatic hydrocarbon formaldehyde resins and modified aromatic hydrocarbon formaldehyde resins synthesized by conventional methods.

The present application is based on the Japanese Patent Application (Japanese Patent Application No. 2013-127439), filed on Jun. 18, 2013, the entire contents of which are incorporated hereby by reference.

INDUSTRIAL APPLICABILITY

The aromatic hydrocarbon formaldehyde resin, the modified aromatic hydrocarbon formaldehyde resin and the epoxy resin according to the present invention can be utilized in broad applications including electric insulating materials, resist resins, semiconductor sealing resins, printed wiring board adhesives, matrix resins for electric laminated plates mounted on electric devices, electronic devices, industrial devices and the like, build-up laminated plate materials, fiber-reinforced plastic resins, sealing resins for liquid crystal display panels, coating materials, various types of coating agents, adhesives, coating agents for semiconductors and resist resins in the semiconductor production.

The invention claimed is:

1. An aromatic hydrocarbon formaldehyde resin, being obtained by reacting an aromatic hydrocarbon compound (A) represented by the following formula (1) with formaldehyde (B) in the presence of an acidic catalyst:

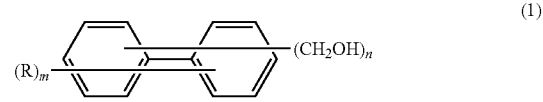

wherein R represents an organic group having 1 to 10 carbon atoms; m and n represent integers satisfying $1 \leq m+n \leq 10$, $m \geq 0$ and $n \geq 1$.

2. The aromatic hydrocarbon formaldehyde resin according to claim 1, being obtained by reacting the aromatic hydrocarbon compound (A) with formaldehyde (B) in a molar ratio of (A):(B)=1:1 to 1:20 in the presence of an acidic catalyst.

3. The aromatic hydrocarbon formaldehyde resin according to claim 2, wherein the reaction of the aromatic hydrocarbon compound (A) with formaldehyde (B) is carried out in the presence of an alcohol.

4. The aromatic hydrocarbon formaldehyde resin according to claim 2, having a weight-average molecular weight of 200 to 25,000.

5. The aromatic hydrocarbon formaldehyde resin according to claim 2, having an oxygen content of 7 to 18% by mass.

6. The aromatic hydrocarbon formaldehyde resin according to claim 2, comprising substantially no diarylmethane.

7. A modified aromatic hydrocarbon formaldehyde resin, being obtained by reacting an aromatic hydrocarbon formaldehyde resin according to claim 2 with at least one selected from the group consisting of compounds represented by the following formulae (2) and (3) in the presence of an acidic catalyst:

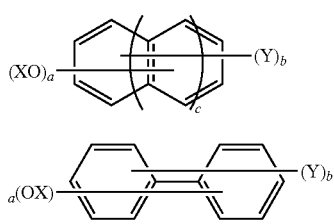

wherein X and Y each independently represent a hydrogen atom or an organic group having 1 to 10 carbon atoms; and a and b represent integers satisfying 1≤a+b≤10, a≥1 and b≥0, and c represents an integer of 0 to 2.

8. A method for producing a modified aromatic hydrocarbon formaldehyde resin, comprising reacting an aromatic hydrocarbon formaldehyde resin according to claim 2 with at least one selected from the group consisting of compounds represented by the following formulae (2) and (3) in the presence of an acidic catalyst:

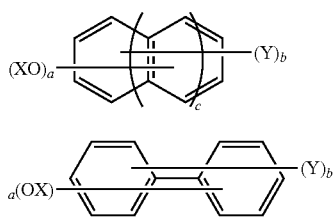

wherein X and Y each independently represent a hydrogen atom or an organic group having 1 to 10 carbon atoms; and a and b represent integers satisfying 1≤a+b≤10, a≥1 and b≥0, and c represents an integer of 0 to 2.

9. The aromatic hydrocarbon formaldehyde resin according to claim 1, wherein the reaction of the aromatic hydrocarbon compound (A) with formaldehyde (B) is carried out in the presence of an alcohol.

10. The aromatic hydrocarbon formaldehyde resin according to claim 9, having a weight-average molecular weight of 200 to 25,000.

11. The aromatic hydrocarbon formaldehyde resin according to claim 9, having an oxygen content of 7 to 18% by mass.

12. The aromatic hydrocarbon formaldehyde resin according to claim 1, having a weight-average molecular weight of 200 to 25,000.

13. The aromatic hydrocarbon formaldehyde resin according to claim 1, having an oxygen content of 7 to 18% by mass.

14. The aromatic hydrocarbon formaldehyde resin according to claim 1, comprising substantially no diarylmethane.

15. A modified aromatic hydrocarbon formaldehyde resin, being obtained by reacting an aromatic hydrocarbon formaldehyde resin according to claim 1 with at least one selected from the group consisting of compounds represented by the following formulae (2) and (3) in the presence of an acidic catalyst:

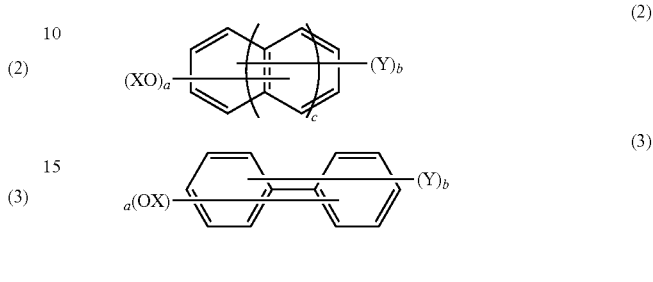

wherein X and Y each independently represent a hydrogen atom or an organic group having 1 to 10 carbon atoms; and a and b represent integers satisfying 1≤a+b≤10, a≥1 and b≥0, and c represents an integer of 0 to 2.

16. The modified aromatic hydrocarbon formaldehyde resin according to claim 15, wherein the compounds represented by the formulae (2) and (3) are at least one selected from the group consisting of phenol, cresol, catechol, hydroquinone, phenylphenol, biphenol, naphthol, dihydroxynaphthalene, hydroxyanthracene and dihydroxyanthracene.

17. An epoxy resin, being obtained by reacting a modified aromatic hydrocarbon formaldehyde resin according to claim 15 with epichlorohydrin.

18. A method for producing an epoxy resin, comprising reacting a modified aromatic hydrocarbon formaldehyde resin according to claim 15 with epichlorohydrin to thereby obtain the epoxy resin.

19. A method for producing a modified aromatic hydrocarbon formaldehyde resin, comprising reacting an aromatic hydrocarbon formaldehyde resin according to claim 1, with at least one selected from the group consisting of compounds represented by the following formulae (2) and (3) in the presence of an acidic catalyst:

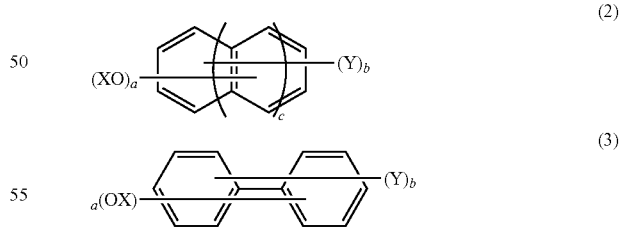

wherein X and Y each independently represent a hydrogen atom or an organic group having 1 to 10 carbon atoms; and a and b represent integers satisfying 1≤a+b≤10, a≥1 and b≥0, and c represents an integer of 0 to 2.

20. A method for producing an aromatic hydrocarbon formaldehyde resin, comprising reacting an aromatic hydrocarbon compound (A) represented by the following formula (1) with formaldehyde (B) in the presence of an acidic catalyst:

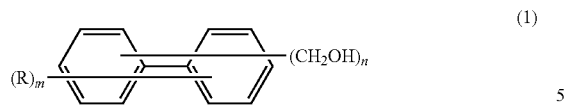
(1)
wherein R represents an organic group having 1 to 10 carbon atoms; m and n represent integers satisfying $1 \leq m+n \leq 10$, $m \geq 0$ and $n \geq 1$.
* * * * *